United States Patent [19]

Franke

[11] Patent Number: 4,459,077
[45] Date of Patent: Jul. 10, 1984

[54] BULK GOODS UNLOADING APPARATUS FOR SHIPS OR SIMILAR MEANS OF TRANSPORT

[75] Inventor: Rüdiger Franke, Mettmann, Fed. Rep. of Germany

[73] Assignee: Mannesmann A.G., Dusseldorf, Fed. Rep. of Germany

[21] Appl. No.: 468,510

[22] Filed: Feb. 22, 1983

Related U.S. Application Data

[63] Continuation of Ser. No. 257,573, Apr. 27, 1981, abandoned, which is a continuation of Ser. No. 22,164, Mar. 20, 1979, abandoned.

[30] Foreign Application Priority Data

Mar. 25, 1978 [DE] Fed. Rep. of Germany ....... 2813182

[51] Int. Cl.³ ..................... B65G 67/60; B65G 37/00
[52] U.S. Cl. .................................. 414/139; 198/509; 198/511; 198/587; 198/605
[58] Field of Search ............... 198/307, 509, 511, 518, 198/587, 605; 414/133, 137–140, 209, 211, 213, 318, 391, 394, 392, 502–504, 917

[56] References Cited

U.S. PATENT DOCUMENTS

| | | | |
|---|---|---|---|
| 1,421,787 | 7/1922 | Kininmenth | 414/139 X |
| 3,497,054 | 2/1970 | Van Kleunan | 198/509 X |
| 3,828,915 | 8/1974 | Cox et al. | 414/139 X |
| 4,258,486 | 3/1981 | Barre | 198/307 X |

FOREIGN PATENT DOCUMENTS

| | | |
|---|---|---|
| 940863 | 1/1974 | Canada ....................... 198/605 |
| 1274987 | 2/1966 | Fed. Rep. of Germany . |
| 1233329 | 1/1967 | Fed. Rep. of Germany . |
| 2100956 | 1/1971 | Fed. Rep. of Germany . |
| 2519447 | 4/1975 | Fed. Rep. of Germany . |

Primary Examiner—Jeffrey V. Nase
Attorney, Agent, or Firm—Mandeville and Schweitzer

[57] ABSTRACT

A bulk goods unloading apparatus for ships or other similar transport vehicles is disclosed. The bulk goods unloading apparatus basically comprises a gantry, movable alongside the transport vehicle, the gantry being provided with a swiveling cantilever system rotating around a first vertical axis. A conveyor belt is provided which runs parallel to the cantilever system. The free end of the cantilever system is provided with a supporting frame which carries a paddle wheel bulk goods pickup device rotatable about a horizontal axis. The supporting frame, itself pivotable about a second vertical axis, is provided with a C-shaped vertical conveyor, which is arranged between the discharge area of the paddle wheel and the charge end of the conveyor belt of the cantilever system.

1 Claim, 8 Drawing Figures

Fig. 6

BULK GOODS UNLOADING APPARATUS FOR SHIPS OR SIMILAR MEANS OF TRANSPORT

This is a continuation of application Ser. No. 257,573, filed Apr. 27, 1981, which is a continuation of application Ser. No. 22,164, filed Mar. 20, 1979, both now abandoned.

BACKGROUND OF THE INVENTION

The invention refers to a bulk goods unloading apparatus for ships or similar means of transport, consisting of a gantry movable along the means of transport, and provided with a swiveling cantilever system rotating around a vertical axis, which system is coordinated with a conveyor belt running along the cantilever system. The free end of the cantilever system is provided with a supporting frame carrying a paddle wheel bulk goods pick-up device revolving vertically. The supporting frame pivots around a vertical axis, while a vertical conveyor is arranged between the paddle wheel and the conveyor belt.

DESCRIPTION OF THE PRIOR ART AND SUMMARY OF THE INVENTION

German Pat. No. 2 100 956 discloses a bulk goods unloading apparatus of the kind described initially which provides, in combination with a paddle wheel discharging overhead, as vertical conveyor a bucket conveyor or belt pocket conveyor, which may be tilted with the supporting frame in the manner of a slanted belt drive. Provision is made that in one terminal position a setting of the vertical conveyor by 90° to the right can be realized, and in the other terminal position by 90° to the left, so that the swivel area of the paddle wheel amounts to approximately 180°.

The disclosed apparatus in German Pat. No. 2 100 956 has the disadvantage of not permitting a swivel area greater than 180°, since a wider setting of a bucket conveyor is impossible, or possible only with unjustifiably great structural input. Furthermore, the conveying capacity of a bucket conveyor is, on one hand, limited and on the other hand the transfer of the goods from the paddle wheel discharging overhead to the bucket conveyor is a difficult problem to solve, so that the entire delivery capacity of the apparatus is limited.

It is the object of the present invention to provide a bulk goods unloading apparatus of the type mentioned above which at high delivery capacity permits favorable feeding of the bulk goods onto the vertical conveyor on one hand, and favorable discharge of the goods onto the conveyor belt on the other hand, while also permitting a much greater range of rotation of the paddle wheel. To solve this problem the arrangement of the invention provides that the paddle wheel discharges to the interior in cantilever fashion of the leg of the supporting frame for the wheel, which frame is in the shape of a C. The C conveyor, which is a familiar device, constitutes a vertical conveyor so that its point of discharge onto the conveyor belt lies within the area of the vertical rotatable axis of the supporting frame for it. This type of C conveyor is, for example, disclosed in the German Pat. No. 25 19 447. It consists of a C-shaped conveying path for overhead delivery, with two conveyor belts, one of which rests on corrugated edges protruding from the other conveyor belt in order to form a closed box-shaped space.

The invention provides an installation which has a maximum capacity not only with regard to its output, but also an installation wherein the supporting frame allows rotation of the cantilever conveyor belt by at least 270°. The C conveyor permits a particularly favorable drop of the bulk goods onto the conveyor belt, since the drop point, when swiveling the supporting frame, always stays the same relative to the conveyor belt.

Another detail of the invention provides a connection between the supporting frame for the C conveyor and the cantilever system via a parallelogram linkage wherein the vertical position of the swivel axis of the supporting frame remains even if the cantilever is tilted on a vertical plane. The proposed parallelogram gear or linkage fulfills the requirement for the vertical position of the swivel axis on any cantilever position without complicated structures. The structure permits pivoting of the cantilever system by means of pulley systems and cables, whereby the parallel guidance is done by the parallelogram gear.

Furthermore, it is provided that the plane of the C conveyor is vertical, and so is the plane of the paddle wheel. Thus, the lower charge or feed point of the C conveyor extends into the paddle wheel. This is advantageous as the charge point of the conveyor is directly below the discharge chute of the paddle wheel discharging into the interior of the conveyor frame, thus guaranteeing safe transfer of the bulk goods. The C conveyor may be positioned in this respect, perpendicular to the paddle wheel. However, it is also possible to have the rotation plane of the C conveyor parallel with the revolving plane of the paddle wheel, whereby the bulk goods are transferred from the paddle wheel to the conveyor belt by means of a well-known discharge chute.

In order to increase the swivel area of the supporting frame of the C conveyor with the paddle wheel attached to it, another embodiment of the invention provides between the supporting frame and the free end of the cantilever system an intermediate member. This allows the swiveling of the supporting frame by 360°. One end of such intermediate member is arranged on the cantilever system rotating around a vertical axis, and the other end carries the supporting frame for the C conveyor for pivoting around another vertical axis. The intermediate member carries an intermediate conveyor connecting the release point of the C conveyor with the conveyor belt in the cantilever system. This system offers a type of winch connection permitting swiveling of the supporting frame by a full 360°.

An example of the invention is shown in the drawings and explained as follows.

DETAILED DESCRIPTION OF THE INVENTION

Figure 1:
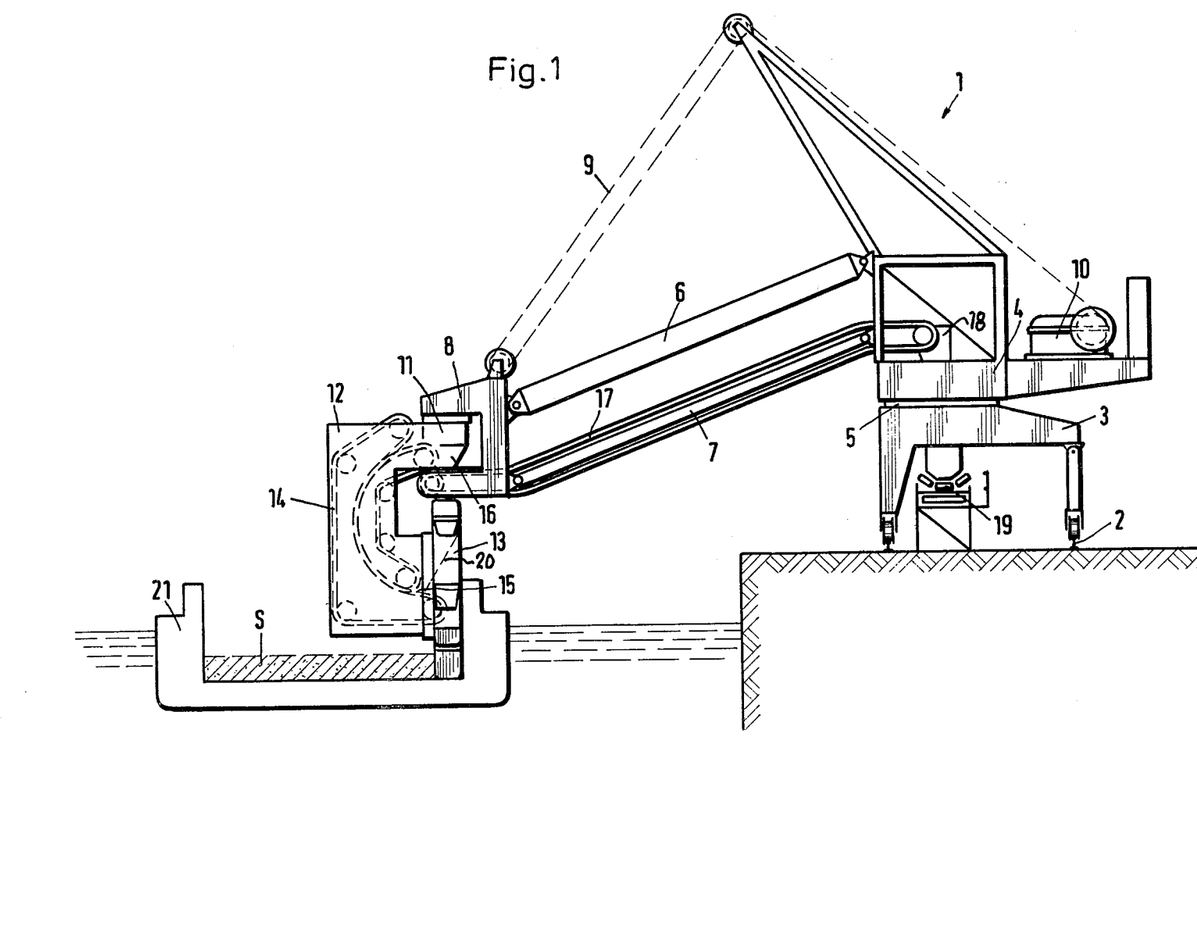
FIG. 1 is a somewhat diagrammatic side elevational view, partly in section, of apparatus illustrating the invention.

In FIG. 1, 1 designates the bulk goods unloading device, consisting mainly of gantry 3 travelling on rails 2, its upper portion 4 rotatable around a vertical axis by means of rotary joint 5. A cantilever system is hinged upon upper part 4 to rotate or move in a vertical plane. The cantilever system is designed as a parallelogram linkage system 6, 7, 8. The coupling links are of such length that the outer end, which is designed to receive the supporting frame of cantilever system 8 always remains in the same spatial position when moving the cantilever system. The cantilever system may be moved via cable gear 9 and pulley systems. The cable winch 10 is arranged on upper part 4 of the apparatus for that purpose. Receiver 8 at the free end of the cantilever system receives the rotary joint 11 for the C-shaped supporting frame 12 which rotates around a vertical axis in rotary joint 11. At the lower end of the C-shaped supporting frame, paddle wheel 13 is arranged at right angles to frame 12 in such a fashion that paddle wheel 13 is positioned approximately in the area of the vertical axis of joint 11 in supporting frame 12.

Vertical conveyor 14 is constructed as a C-shaped conveyor arranged within supporting frame 12 so that its charge point 15 lies at least partially inside the paddle wheel 13 discharging into the interior. Release point 16 of the C conveyor lies in the area of the vertical axis 11 of supporting frame 12 above conveyor belt 17 which leads along the cantilever system to the rotating upper portion 4 of apparatus 1, where the bulk goods are dropped into central transfer 18. From there the bulk goods go to longitudinal conveyor belt 19 running at right angle to the gantry 3. For discharge of the bulk material from paddle wheel 13, chute 20 is provided in addition, being designed in the usual manner.

The bulk material contained in the ship's body 21 in this example is picked up by revolving paddle wheel 13 and brought via chute 20 to charge point 15 of C conveyor 14. This conveyor transports the bulk goods by means of the covering belt through the C-shaped frame 12 to the top where it is dropped at release point 16 onto conveyor belt 17. From conveyor belt 17 the bulk material is dropped through the central transfer 18 in the center of apparatus 4 onto longitudinal belt 19 running along beneath gantry 3, and is thus transported further.

Figure 2:
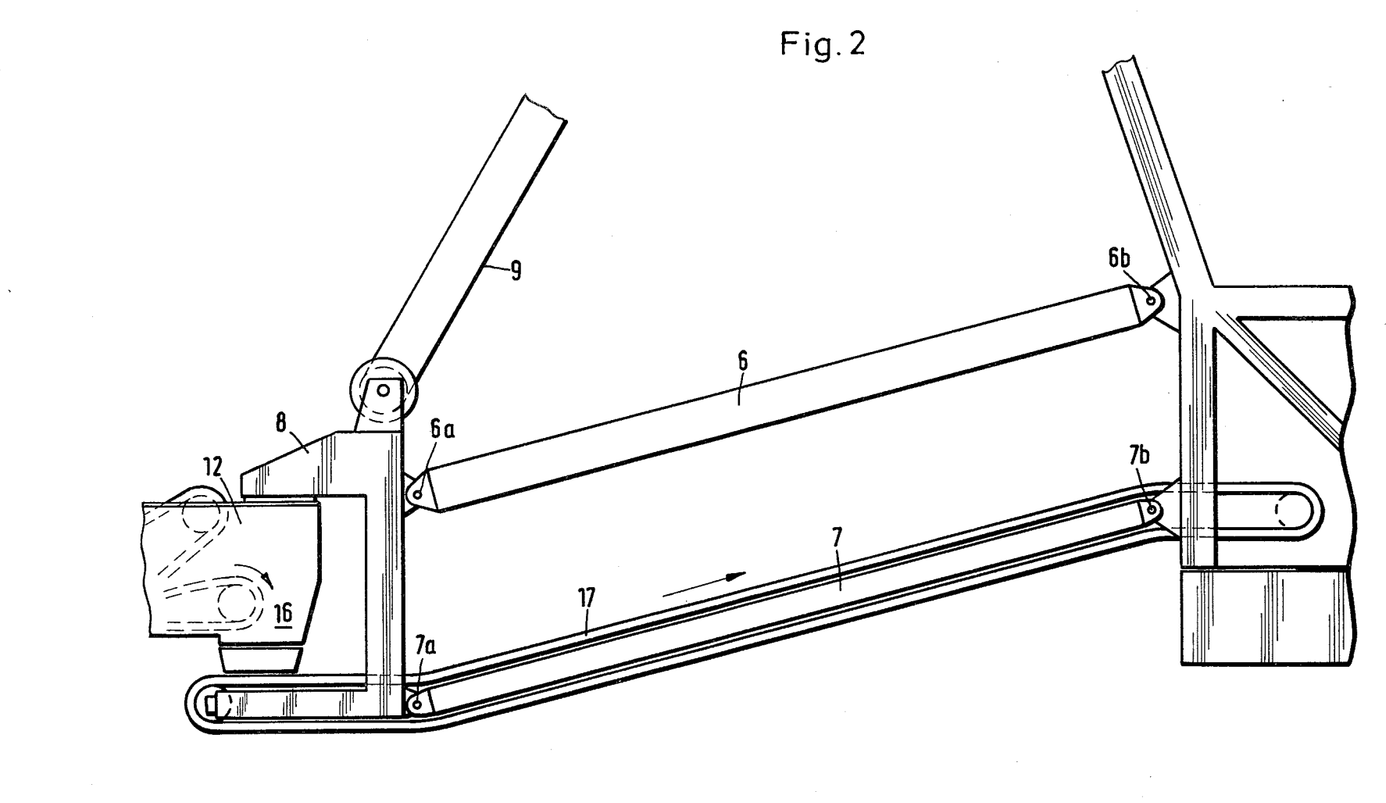
FIG. 2 is an enlarged view of a portion of the apparatus of FIG. 1 illustrating the parallelogram arrangement for the cantilevered conveyor.

The parallel guide of the cantilever system is shown in detail in FIG. 2, whereby identical parts have identical reference numbers. The hinged connection of cantilever parts 6 and 7 at 6a and 6b and 7a and 7b, as well as the length of the cantilever parts 6 and 7 are chosen so that the swivel axis of supporting frame 12 in receiver 8 is vertical at all times. Receiver 8 is also supported with the pulley for cable guide 9 serving to raise and lower the cantilever system.

Figure 3:
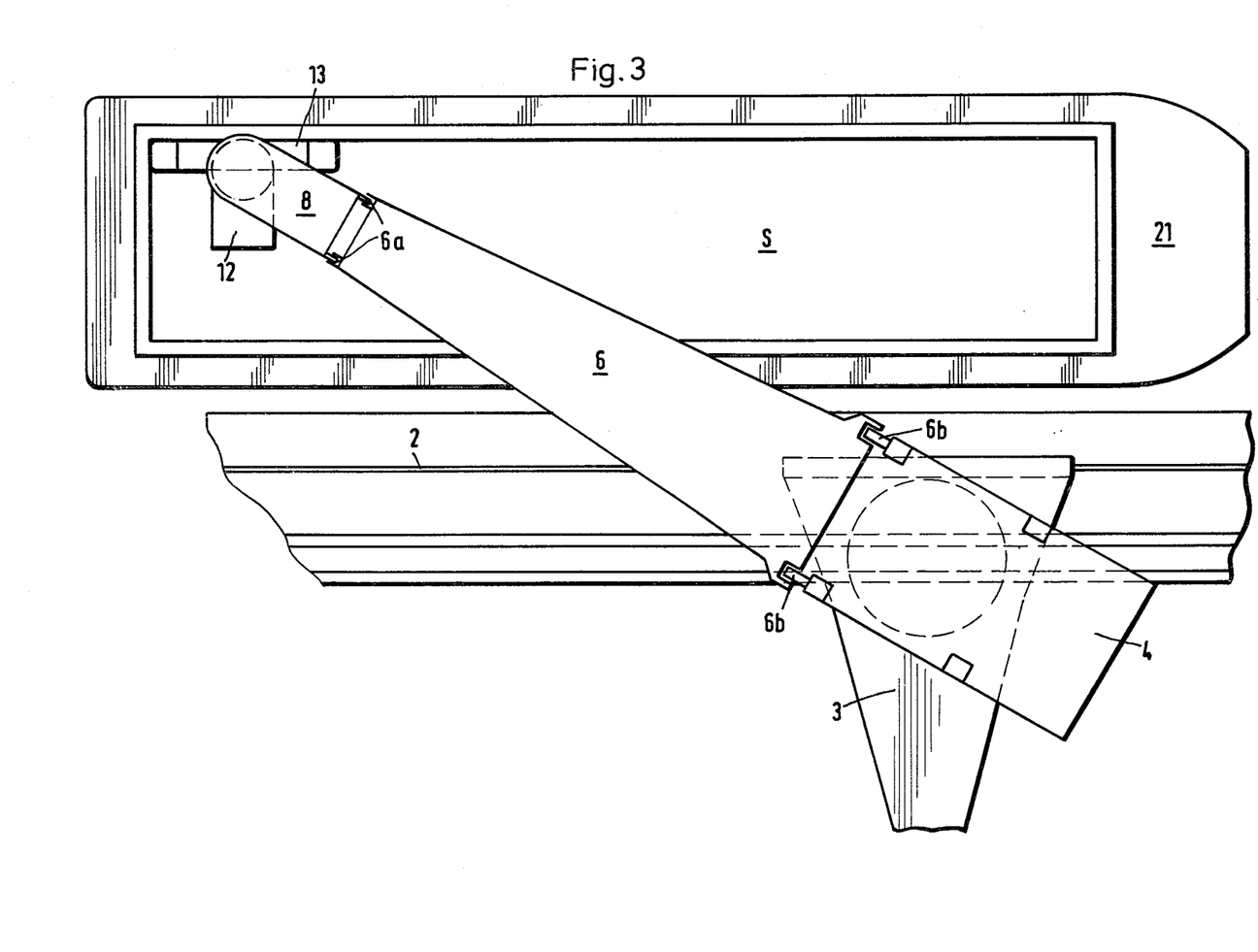
FIG. 3 is an enlarged top plan view of a portion of the apparatus of FIG. 1 illustrating the positioning of the apparatus relative to a ship to be unloaded.
Figure 4:
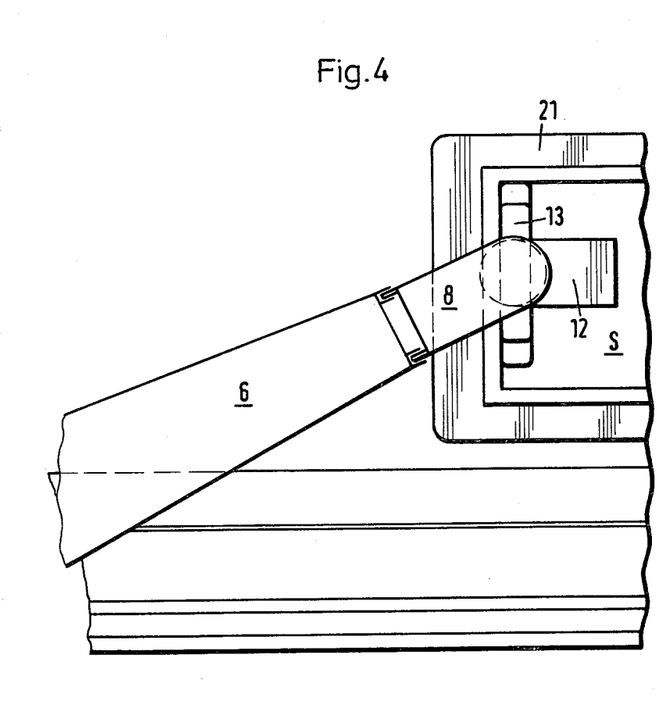
FIGS. 4 and 5 are views similar to FIG. 3 illustrating various positions of the apparatus of the invention.
Figure 5:
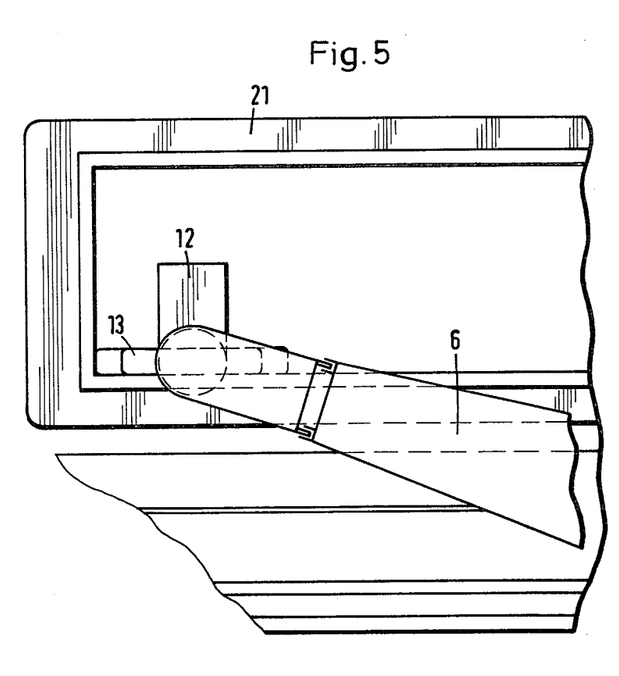

FIG. 3 also has identical numbers for identical parts. The top plan view of the bulk goods unloading apparatus according to the invention shows that the paddle wheel 13 may be moved into position where it revolves parallel with the lateral wall of ship 21 to be unloaded. The C-shaped supporting frame 12 for the C conveyor is arranged at right angles to the rotation plane of the paddle wheel. In order to receive the bulk goods in the area of the ship's walls at prow and stern, paddle wheel 13 may be rotated with supporting frame 12 by 90° versus the position shown in FIG. 3 so that it reaches the position shown in FIG. 4. Another position of paddle wheel 13 is shown in FIG. 5, where it is rotated 180° from the position shown in FIG. 3, and 90° from the position shown in FIG. 4.

Figure 6:
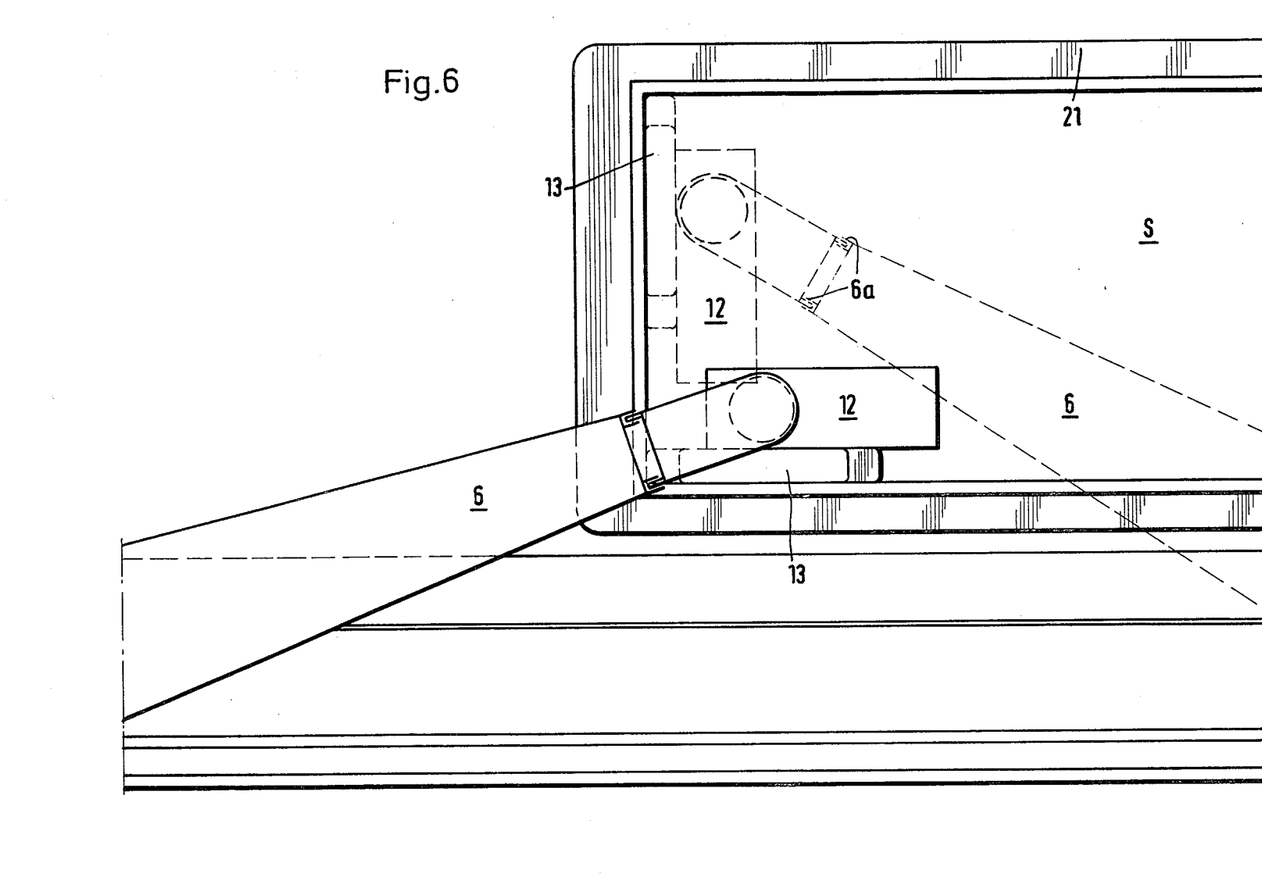
FIG. 6 is a view similar to FIG. 3, but illustrating positions of the apparatus incorporating an embodiment wherein the paddle wheel and the C-shaped conveyor are positioned in parallel planes.

FIG. 6 shows a plan view of a further embodiment of the invention on which the supporting frame 12 is provided on a plane parallel with the rotation plane of the paddle wheel. This example shows, in broken lines, the position of the paddle wheel rotated by 90°.

Figure 7:
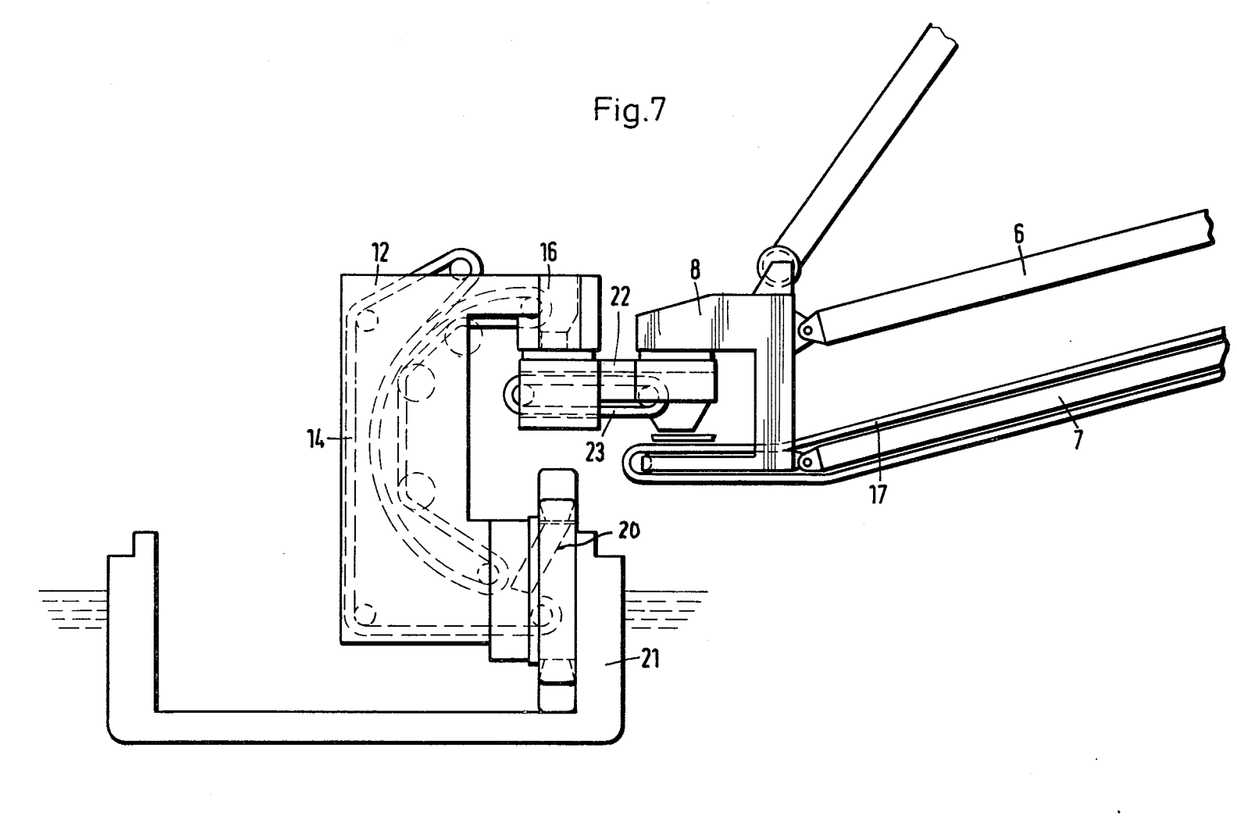
FIG. 7 is a view of apparatus similar to FIG. 1 but showing a further embodiment of the invention wherein an intermediate lever member is used to increase the angle of rotation of the apparatus.
Figure 8:
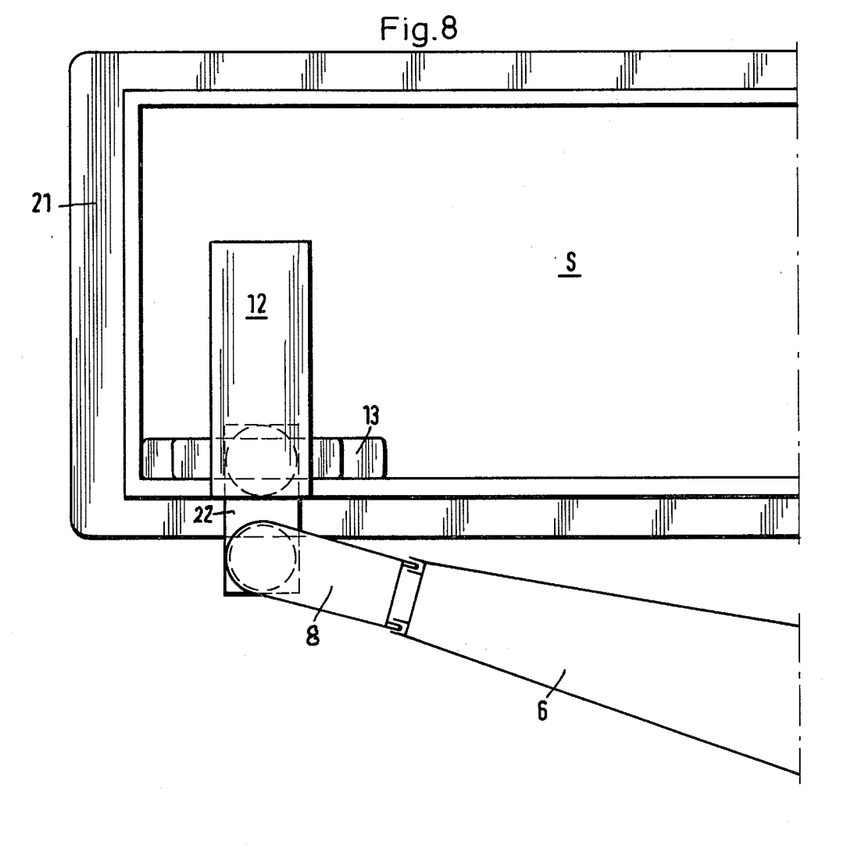
FIG. 8 is a top plan view of a portion of the apparatus of FIG. 7.

FIG. 7 shows a further embodiment of the invention wherein the rotation plane of the paddle wheel may be turned by 360°. To this end, provision is made between receiver 8 of cantilever system 6, 7 and supporting frame 12 for intermediate member 22, which pivots on one hand around the vertical axis 11 of receiver 8 in horizontal direction, and on the other hand carries supporting frame 12 which pivots around another vertical axis parallel with axis 11 and supporting frame 12. Intermediate member 22 carries conveyor 23, making the connection between release point 16 of the C conveyor 14 and conveyor belt 17. Intermediate member 22 acts in the manner of a crank, and permits the desired range of swiveling by 360°.

Hydraulic or electric controls, not being part of the present invention are not shown for clarity, and are used to largely automate the unloading of the transporting vehicle, whereby swiveling of paddle wheel 13 and movement of gantry 3 along the transporting vehicle is carried out automatically.

I claim:

1. A bulk goods unloader apparatus for ships and the like, comprising:
    (a) transport means movable along the area to be unloaded;
    (b) a gantry disposed on said transport means;
    (c) an elongated conveyor system having a charge end and a discharge end, said elongated conveyor system cantilevered from said gantry and swingable thereon about a first vertical axis;
    (d) an intermediate conveyor member disposed upon said elongated cantilevered conveyor system at the end thereof, opposite said first vertical axis;
    (e) said intermediate conveyor member swingable on a second vertical axis disposed upon the end of said elongated cantilevered conveyor system opposite said first vertical axis;
    (f) a continuous bulk goods moving C-shaped vertical conveyor having a charge end located on the lower end of the C-shape and a discharge end located on the upper end of the C-shape, said C-shape vertical conveyor disposed adjacent the end of said intermediate conveyor member not being provided with said second axis;
    (g) said C-shaped vertical conveyor being pivotable about said intermediate conveyor member on a third vertical axis passing through the end of said intermediate conveyor member not being provided with said second vertical axis;
    (h) said intermediate conveyor member being provided with a conveyor means extending between said second vertical axis and said third vertical axis;

(i) said discharge end of said C-shaped vertical conveyor being positioned in general vertical alignment with said third vertical axis;

(j) said discharge end of said C-shaped vertical conveyor being disposed above said charge end of said intermediate conveyor member;

(k) a paddle wheel bulk goods pickup device having a charge area and a discharge area, said paddle wheel bulk goods pickup device disposed about said charge end of said C-shaped vertical conveyor and rotatable on a horizontal axis, said horizontal axis being perpendicular to the direction of the movement of the conveyor belt of said C-shaped vertical conveyor;

(l) said paddle wheel bulk goods pickup device serving to discharge bulk goods onto a substantially inclined trough, which directly transfers the goods onto said charge end of said C-shaped vertical conveyor; and (m) the discharge area of said paddle wheel bulk goods pickup device being directly located beneath and in general vertical alignment with said third vertical axis.

* * * * *